No. 854,561. PATENTED MAY 21, 1907.
J. & H. J. BROOKES.
METALLIC BEDSTEAD.
APPLICATION FILED FEB. 1, 1906.
4 SHEETS—SHEET 1.
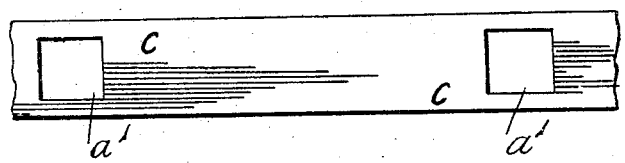
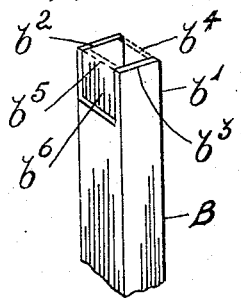
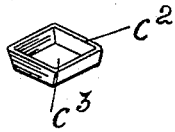
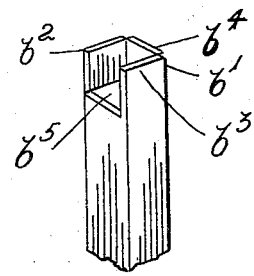
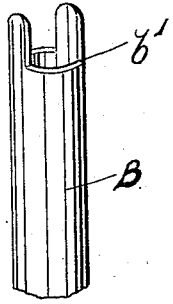
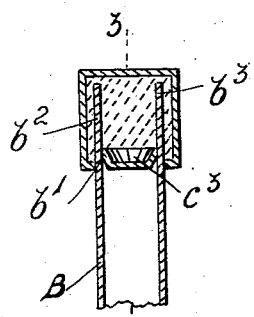
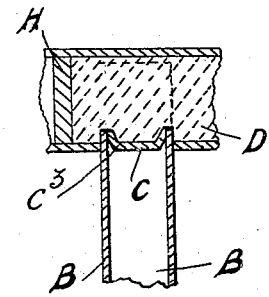
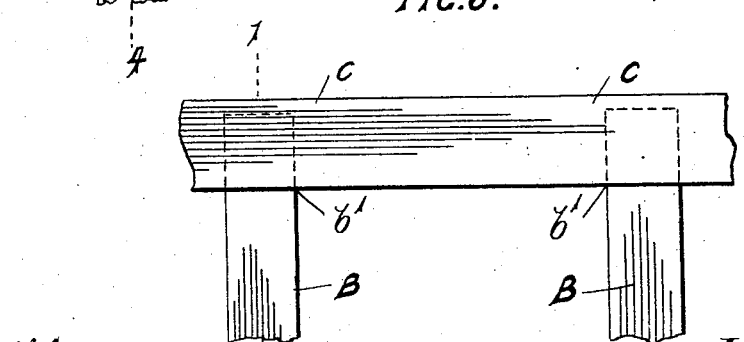
witnesses.
H. L. Trimble
F. H. Moffett
Inventors.
Josiah Brookes
Henry J. Brookes
by Chas. F. Mieher
their attorneys No. 854,561. PATENTED MAY 21, 1907.
J. & H. J. BROOKES.
METALLIC BEDSTEAD.
APPLICATION FILED FEB. 1, 1906.

4 SHEETS—SHEET 2.

No. 854,561. PATENTED MAY 21, 1907.
J. & H. J. BROOKES.
METALLIC BEDSTEAD.
APPLICATION FILED FEB. 1, 1906.
4 SHEETS—SHEET 3.
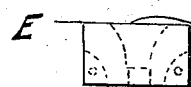
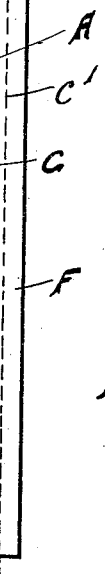
FIG. 8.
FIG. 10. 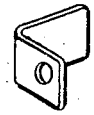 FIG. 11.

Witnesses. Inventors.

No. 854,561. PATENTED MAY 21, 1907.
J. & H. J. BROOKES.
METALLIC BEDSTEAD.
APPLICATION FILED FEB. 1, 1906.

4 SHEETS—SHEET 4.

Witnesses
H. L. Trimble
F. H. Moffatt

Inventors.
Josiah Brookes
Henry J. Brookes
by Chas. H. Miller
their attorney.

UNITED STATES PATENT OFFICE.

JOSIAH BROOKES AND HENRY JAMES BROOKES, OF SMETHWICK, ENGLAND.

METALLIC BEDSTEAD.

No. 854,561.  Specification of Letters Patent.  Patented May 21, 1907.

Application filed February 1, 1906. Serial No. 299,034.

*To all whom it may concern:*

Be it known that we, JOSIAH BROOKES and HENRY JAMES BROOKES, subjects of the King of Great Britain, both residing at the Cape Works, Smethwick, in the county of Stafford, England, manufacturers of metallic bedsteads, have invented new and useful Improvements in Metallic Bedsteads; and we hereby declare that the following is a full, clear, and exact description of the same.

The object of this invention is to construct metallic bedsteads without any external castings being used for the joints of the rails or where attached to the pillars, at the same time also insuring their rigidity and reducing the cost of manufacture.

In order that this invention may be clearly understood and more easily carried into practice, we have appended hereunto two sheets of drawings upon which we have illustrated the nature of our said improvements.

Figure 8A:
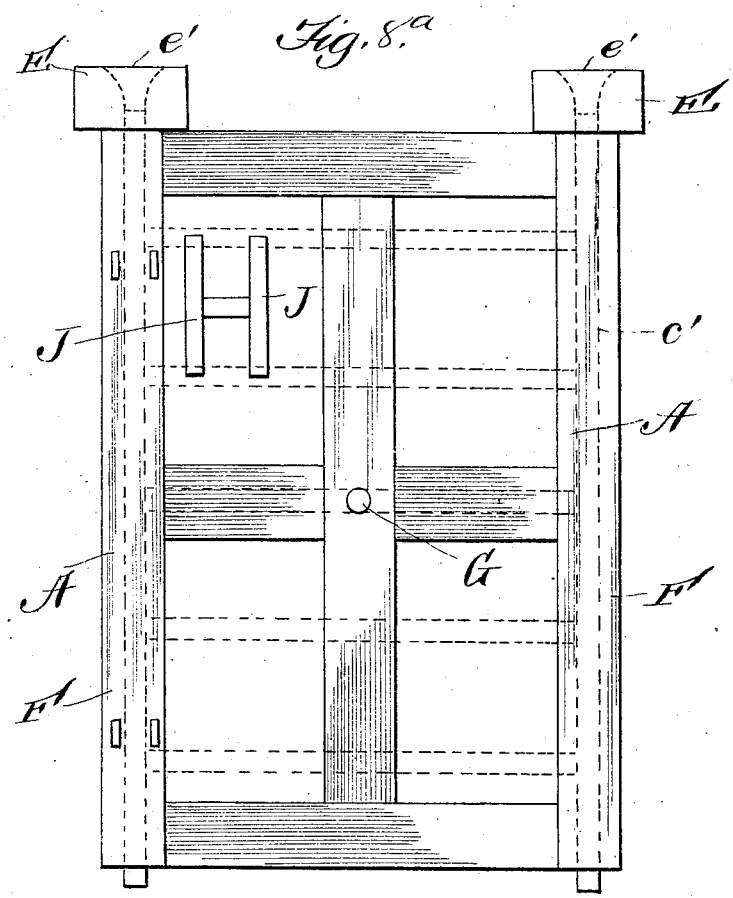
Figure 7A:
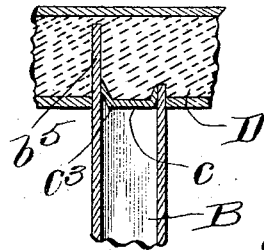
Figure 9:
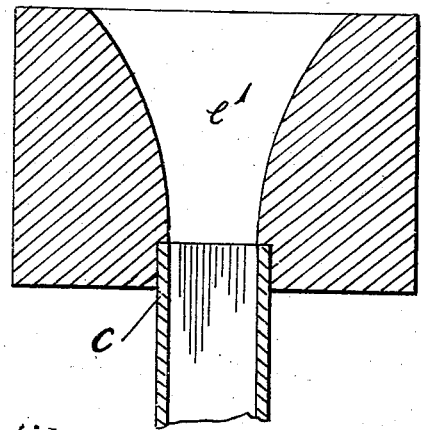
Figure 12:
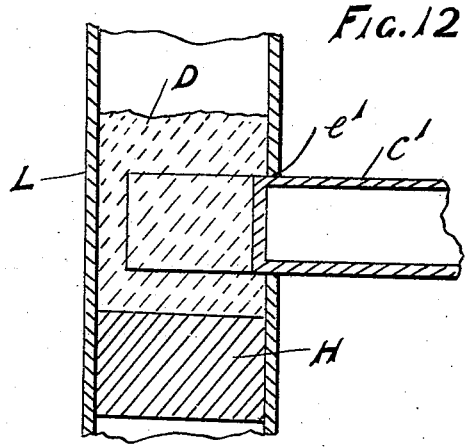
Figure 13:
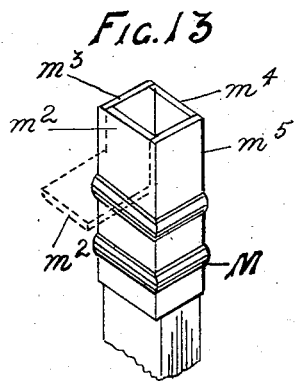
Figure 17:
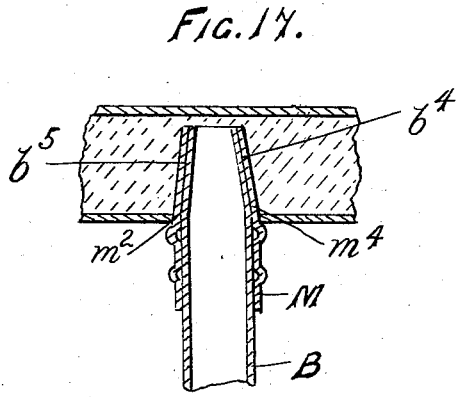
Figure 18:
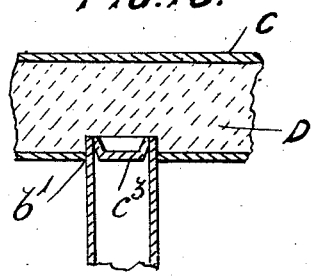

Figure, 1, is a view of the cross rail showing the holes therein. Fig., 2, is a view of the end of the vertical tube. Figs., 3, and 3ª are similar views to Fig. 2, but showing a modification. Fig., 4, is a view of one form of plug. Fig., 5, is an elevation of the cross rail showing the tubes inserted therein. Fig., 6, is a cross section through Fig. 5 on the line 1—2. Fig., 7, is a vertical section through Fig. 6 on the line 3—4. Fig. 7ª is a modification of the construction shown in Fig. 7. Fig., 8, is a view of the frame and funnels or pouring blocks. Fig. 8ª is a modification of the construction shown in Fig. 8. Fig., 9, is a section through the funnels or pouring blocks. Figs. 10 and 11 are views of tabs suitable for fixing panels to. Fig. 12. is a section showing the method of connecting the rails to the pillars. Fig. 13 is a view of the rod end and vertical tube. Figs. 14, 15, 16 and 17 are sections showing means for securing the rod end to the cross tubes. Fig. 18. is a similar view to Fig. 7 but showing a modification.

In constructing bedsteads by the method now described, the cross or horizontal tubes or bars C C' of the rails A have holes $a'$ punched in them at suitable distances to receive the ends $b'$ of the vertical tubes B. In the case of round tubes the holes are sometimes drilled instead of being punched. The ends $b'$ of the vertical tubes B where they fit into the holes punched in the cross tubes are cut out by suitable tools so that, when square tubes are employed two sides $b^4$ $b^5$ as shown by dotted lines in Fig. 2 which are at right angles to the foot of the rail are removed, the slots $b^6$ extending slightly less in length than the internal measurement of the tube into which they are fitted so as to prevent the slot being seen when the rail is completed. The ends of the tubes B are stopped up by means of the plugs $c^3$. As shown in Fig. 4, these plugs have the shape of shallow dish shaped plates, with the surrounding flanges $c^3$ tapering toward the bottom of the plug so that they may be easily driven into the end of the tube to completely close the same.

The vertical tubes B having all been prepared at the ends as above described are inserted in the holes $a'$ which have been punched in the cross tubes A, the two sides $b^2$ $b^3$ of the vertical tubes B which project into the cross tubes $c$ $c'$ being parallel with the sides of the cross tubes. By this arrangement the interior of the cross tubes is not blocked up by the projecting ends $b^2$ $b^3$ of the vertical tubes B. The rail being thus put together, the tubes are secured in position and the rigidity of the rail insured by pouring into the cross tubes molten iron, or in the case of brass rails or of iron rails, the tubes of which have been japanned a metal which melts at a low temperature such as lead, tin or spelter or any suitable metal or composition of metal which when fluid will not damage the brass and is in each case illustrated by the letter D.

Instead of a metallic filling various other compositions can be employed such as filling composed of resin and pitch mixed with plaster of paris but of course all such compositions must be sufficiently fluid to fill up the cross tubes and then set solid and be of such a character as will not be affected by the heat if the rails are to be subsequently japanned. In some cases the tubes composing the rails are japanned before being put together. The vertical tubes B having been stopped at the ends by the above mentioned plugs $c^3$ they are of course prevented from being filled with the metal or composition. In order to pour the metal or composition into the tubes more easily funnels or pouring blocks E may be provided which have a wide conical hole. These molds are attached to a rail frame F in which the rails and tubes are fixed.

The rails are fitted in such rail frames F and the top and bottom cross tubes C C' have their ends projecting into the funnels or pouring blocks E as shown by dotted lines Fig. 8. The wide conical hole $e'$ allows the metal or composition D to be poured into the tubes more easily than when the chill molds E are not used. To facilitate the metal or composition being poured the rail frames F are arranged to hold the rails so that the cross or horizontal tubes $c$ $c'$ are in a vertical position or, in any case, at an angle. Sometimes the metal or composition D is poured into the cross tubes C C' at one end only, sometimes at both ends.

In order to save the labor of lifting and reversing the rail frame F when the cross tubes C C' are to be filled with the metal or composition D at both ends, we sometimes mount the rail frame F upon a central support or pivot G which allows it to revolve, thus bringing the rail into the most convenient position for pouring the metal or composition into the cross tubes. When the cross tubes are filled from more than one place or from both ends, we plug, as above described, the tube in a convenient position so as to prevent the metal or composition filling up beyond the part plugged. Sometimes in lieu of the plugs such as H Fig. 7 we leave a third side $b^4$ of the vertical tube B as shown by full lines $b^5$ Fig. 7$^a$ instead of punching it out, as hereinbefore described, and shown. This third side being pushed into the cross tube will act as a stop to prevent the metal or composition D flowing beyond that point. In some cases instead of using the plugs as hereinbefore described for the purpose of plugging up the ends of the vertical tubes, we cut or saw the ends of the tubes themselves, and then bend down one or two of the sides and so stop up the ends of the tubes which enter the cross tubes. If one side $b^4$ only is bent as shown by Fig. 3, the other side $b^5$ is cut away so as to insure an open passage in the inside of the cross tubes C C' for the flow of the metal or composition D, and the two remaining sides $b^2$ $b^3$ project into the cross tubes as hereinbefore described.

By the method above described rails of bedsteads can be made without any external chill castings such as. are generally used, while the same rigidity can be secured as in the ordinary cast rails, When the interior or pattern of the rail is broken up by additional cross tubes J as shown by dotted lines in Fig. 8$^a$ these cross tubes are jointed to corresponding short vertical tubes $j'$ in the same manner as above described and then these parts of rails are cast into the complete rail. Sometimes when panels are introduced into the rails they are secured to small flat pieces of metal or tabs K Figs. 10 and 11, which are inserted in slots which are cut into tubes in corresponding positions. These pieces of metal or tabs project into the tubes and are secured by the metal or composition being poured around them.

By the method above described the present expensive method of jointing and fitting up by means of plugs, screws, and the like of best iron rails and also brass rails, is superseded, while it is obvious that not only square tubes, but also tubes both round and other sections, can be dealt with in a similar manner, When tubes are used which are not square in section, the ends which penetrate into the cross tubes are formed in such a manner as will correspond in principle, as hereinbefore described for tubes of square section, so as to allow the metal or composition to flow uninterruptedly along the cross tubes, or in other instances to limit the flow of the same at some point as hereinbefore described.

In some instances the cross tubes C C' are fixed to the vertical tubes B in the method above described as for example where the cross tubes are fixed to the standards or outside vertical tubes in the rails.

Instead of the usual methods adopted for securing the rail to the pillars, we prefer to drill or punch holes $e'$ in the pillars L corresponding in shape to the section of the top and bottom tubes C C' of rails A. These top and bottom tubes are left sufficiently long to penetrate some distance into the pillars. Underneath these projecting ends the pillars are plugged as hereinbefore described by means of plugs H corresponding to the shape of the pillars, these plugs being to prevent the metal or composition flowing down the pillars, The rails having been mounted in the pillars, the metal or composition is poured over the projecting ends to a sufficient depth to cover them, thus securely fixing them in the pillars without any external bands of metal or other projections. In some instances it is obvious that the bottom tube $c'$ only, is fitted to the pillars in this manner, the top tube C of the rail being fixed to a brass or iron top tube which fits into the top mount of pillar as usual in the metallic bedstead trade.

Figure 14:
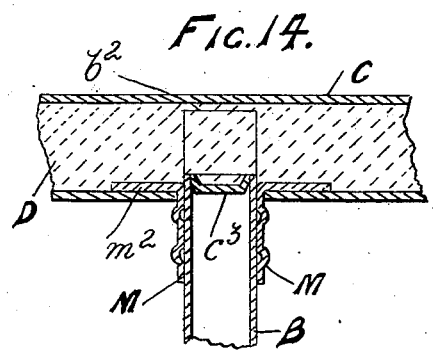
Figure 15:
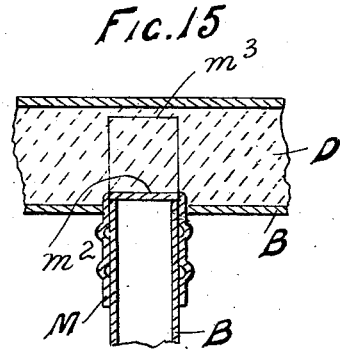
Figure 16:
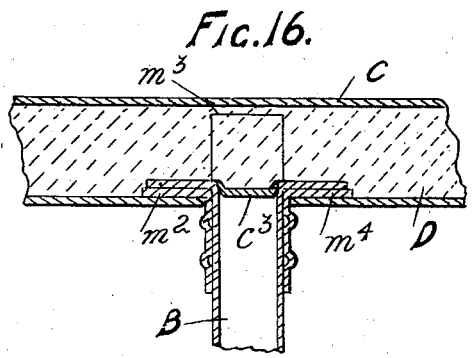

In some cases it is necessary for the tubes composing the rails to be mounted at the ends with brass mounts M Fig. 14 generally called in the bedstead trade, rod ends, In order to adapt the use of such rod ends M to the requirements of this invention it is necessary to make them differently from those usually employed in the trade. When we construct rails which have to be so mounted instead of the rods ends being closed as usual at the top with only a small hole to admit a screw being passed through for the purpose of fitting up the rail we make the rod ends M with a neck Fig. 13 the same size as the tube over which it fits. This neck projects into the cross tubes $c$ $c'$ and is generally cut or sawed into four parts $m^2$ $m^3$ $m^4$ $m^5$. Two of these parts $m^3$ $m^5$ which are parallel with the front and back of the cross tubes remain vertically inside the cross tubes. The other two parts $m^2$ $m^4$ are bent over right and left by suitable tools along the inside of the cross tubes as shown by Fig. 14. The vertical tubes B are then fixed in position inside the rod ends M and the cross tube C, and the whole are secured together by filling up the cross tubes with the metal or composition as hereinbefore described.

The two vertical parts of the neck may be dispensed with and the rod ends made with two projecting pieces $b^4$ $b^5$ which as above described are bent over to secure the rod ends in position as shown by Fig., 16. In some cases the neck is made shorter and projecting only a short distance into the cross tubes need not be bent over as described since it does not interfere with the pouring, and filling of the cross tubes as shown by $m^2$ Fig. 15. This short neck may be closed in if required to cover the end of vertical tube while in some cases such as shown by Fig. 17 the vertical tubes B are tapered at the ends, and the rod ends M have taper necks to correspond. These necks M together with the vertical tubes B are inserted in the cross bars $c$ $c'$ and are secured by the metal or composition D as hereinbefore described, since the taper necks allow the metal or composition to flow around them thus filling up the cross tubes. It is obvious that vertical tubes thus tapered, and without rod ends, can also be cast up in this manner. The vertical tubes A can also be left plain at ends as shown by Fig. 18 projecting only a short distance into the cross tubes in which case they do not in any way interfere with the pouring and filling of the cross tubes, the ends being plugged as hereinbefore described.

What we claim as our invention, we desire to secure by Letters Patent is;—

1. A metallic bedstead comprising a series of tubes having tube receiving apertures therein, a series of transverse tubes contained in the tube apertures of the first mentioned tubes, plugs for the ends of the last mentioned tubes and a cementing element contained within and rigidly securing the tubes together.

2. A metallic bedstead comprising a series of horizontal tubes, having tube receiving apertures therein, a series of transverse tubes having their ends contained in the tube apertures of the horizontal tubes and having not more than three sides of each end cut away, plugs within the horizontal tubes and a cementing substance contained in the tubes to secure horizontal tubes to the transverse tubes.

3. A metallic bedstead comprising a series of tubes having tube receiving apertures therein, a series of transverse tubes contained in the tube apertures of the first mentioned tubes, plugs for the ends of the last mentioned tubes, a cementing element contained within and rigidly securing the tubes together and mounts attached to the ends of the transverse tubes and having out turned locking members contained in the cementing substance.

4. A metallic bedstead comprising a series of horizontal tubes, having tube receiving apertures therein, a series of transverse tubes having their ends contained in the tube apertures of the horizontal tubes and having not more than three sides of each end cut away, plugs within the horizontal tubes and a cementing substance contained in the tubes to secure horizontal tubes to the transverse tubes and mounts attached to the ends of the transverse tubes and having out turned locking members contained in the cementing substance.

In witness whereof we have hereinto set our hands in the presence of two witnesses.

JOSIAH BROOKES.
HENRY JAMES BROOKES.

Witnesses:
WALKER A. E. BARKAM,
JUSTUS JONES.